73-649

XR 3,719,193

United Stat
Doyle

[11] 3,719,193
[45] March 6, 1973

[54] PNEUMATIC CONTROL SYSTEM FOR VIBRATION DETECTOR

[76] Inventor: Donald A. Doyle, P.O. Box 3775, Santa Ana, Calif. 91803

[22] Filed: Dec. 9, 1971

[21] Appl. No.: 206,247

Related U.S. Application Data

[63] Continuation-in-part of Ser. No. 93,053, Nov. 27, 1970.

[52] U.S. Cl. .......................................137/38, 73/70
[51] Int. Cl. ...............................................G05b 9/00
[58] Field of Search ...........137/38, 45; 73/67, 70, 71

[56] References Cited

UNITED STATES PATENTS 3,512,555  5/1970  Severson ..............................73/71 X

*Primary Examiner*—James J. Gill
*Attorney*—Candor, Candor & Tassone

[57] ABSTRACT

A pneumatically operated control system for use with a pneumatically operated vibration detector serves to discriminate between false transient conditions and conditions due to excessive vibration forces. The control system uses a number of similar diverter valves connected to provide the desired control functions. A start delay is provided to eliminate operation of the system in response to any vibration forces normally encountered during the starting period. A vibration condition occurring after the start delay causes the vibration detector to be tripped to provide a signal to two diverter valves, each of which has a pneumatic delay. Operation of one of the diverter valves causes the vibration detector to be reset. If the vibration condition continues the vibration detector is repeatedly tripped and reset until the delay for the other diverter valve is overcome to cause it to operate to provide a signal for terminating the operation of the control system and the equipment being protected. A visual indication of the status of the control system is provided. The system is also usable for monitoring more than one vibration detector. In such applications, a visual indicator is used to indicate the status of each vibration detector.

16 Claims, 2 Drawing Figures

PNEUMATIC CONTROL SYSTEM FOR VIBRATION DETECTOR

This application is a continuation-in-part application of copending patent application, Ser. No. 93053 now pending, filed Nov. 27, 1970, and assigned to the same assignee to whom this application is assigned.

BACKGROUND OF THE INVENTION

1. Field of the Invention

The invention presented herein relates to a pneumatically operated control system used with one or more vibration detectors to discriminate between false transient excessive vibration conditions and vibration conditions desired to be detected.

2. Description of the Prior Art

U. S. Pat. No. 2,966,617 discloses an electrically operated system used with a vibration detector unit. The system provides a start delay and by use of a thermal relay provides for the detection of a continuous disturbance or vibration and for the detection of a series of vibration conditions which occur within a time interval that allows the thermal relay to be operated. Electrically operated systems which provide such a start delay and monitoring delay have been used extensively. However, there is need for systems to be used with a pneumatic version of the vibration detector which will be pneumatically operated and provide a start delay and provide for the detection of a continuous disturbance or vibration and a series of vibration conditions.

SUMMARY OF THE INVENTION

The invention is characterized in a pneumatically operated system used with a pneumatically operated vibration detector, the system including three pneumatic delays and a number of like diverter valves connected as "AND" or "NOT" elements. A first AND valve is actuated by momentarily actuating a start valve. A first NOT valve connects with the AND valve to feed the output from the AND valve back to an input of the AND valve to hold the AND valve in the activated position and supply an output signal for the system which is used to control the equipment to be protected by the system. A visual indicator for each vibration detector is used to indicate the status of the associated detector. The output from the AND valve is also applied to a start delay. The start delay provides the time needed for the equipment being controlled to reach its normal operating mode before the remainder of the system is brought into operation.

A second AND valve connects with the start delay network. Upon completion of the start delay the second AND valve is operated to connect the pressure supply to a second NOT valve for passage there through provided the second NOT valve does not have an actuating signal presented to it. In the case of a single vibrator detector being monitored, the pressure supply from the second AND valve connects with the second NOT valve and the system's main pneumatic supply is connected to the vibration detector and to the NOT valve to supply an actuating signal to the second NOT valve so long as the vibration detector is not tripped. When the vibration detector is tripped the pressure supply is connected via the second NOT valve to two delay networks, one of which provides shorter delay than the other. The shorter delay network is connected to a third AND valve. Upon completion of the shorter delay the third AND valve is actuated to connect the pressure supply to the vibration detector to reset it thereby allowing the second NOT valve to be operated so no additional fluid is supplied to the two delays connected with the second NOT valve. A one-way valve connected to the shorter delay is effective upon actuation of the NOT valve to quickly reset the shorter delay network. Resetting of the longer delay is begun and can only be completed if enough time lapses before the vibration detector is again tripped. The delay networks are brought into operation each time the vibration detector is tripped. Each tripping of the vibration detector can allow the longer delay network to build up a signal. The longer delay network connects with a fourth AND valve which will be operated by the signal developed by the longer delay network in response to successive actuations of the vibration detector. The fourth AND valve provides a control signal to the first NOT circuit to cause it to be actuated to remove the holding path to the first AND valve and therefore the output signal for the system. Upon loss of the actuating signal for the first AND valve the start delay network is reset. The start valve must be actuated momentarily to again start the system and therefore the equipment being controlled.

In the preferred embodiment of the invention and also when more than one vibration detector is connected to the system, a fifth AND valve is used which responds to the output from the third AND valve to quickly connect the main system pressure supply as the actuating signal to the second NOT valve to cause it to be operated rapidly following resetting of the vibration detector in response to the output from the third AND valve.

The invention thus provides a pneumatically operated system for use with one or more pneumatic operated vibration detectors.

The invention also provides such a system which is constructed using a number of diverter relays which may be identical.

The invention also provides a pneumatic system for use with a pneumatic vibration detector which has a start delay preventing shut down of the equipment being monitored in response to vibrations encountered during the time it takes the equipment to reach its normal operating mode.

In addition, the invention provides a pneumatic system for use with a pneumatic vibration detector which during normal operation of the equipment being monitored is responsive to damaging vibration conditions which may be continuous or may occur a number of times in succession.

Other features and advantages of the invention will become apparent from the following description of the preferred embodiment taken in conjunction with the accompanying drawing wherein:

FIG. 1 is a schematic showing of the monitoring and control system for a single vibration detector, and FIG. 2 is a schematic showing of another embodiment of the monitoring and control system connected to monitor more than one vibration detector.

DETAILED DESCRIPTION

Figure 1:
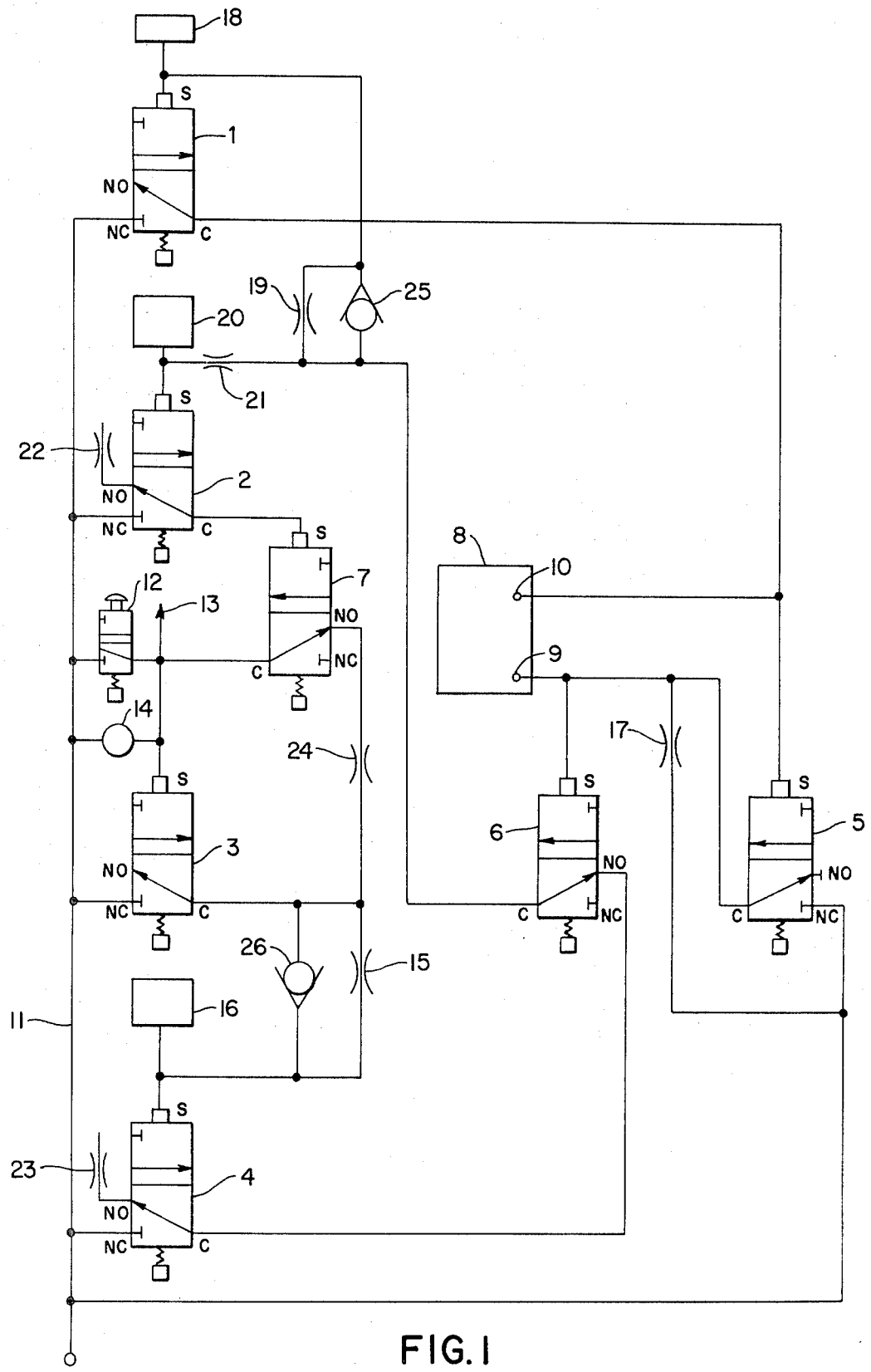

Referring to FIG. 1 of the drawing seven diverter valves 1-7 are used in the control system. Diverter valves 1-5, inclusive, are connected to provide an AND function and therefore require two inputs to provide a single output. Diverter valves 6 and 7 are connected as NOT units in that each has one controlled input and each provides a single output provided the input signal is not present. Diverter valves, Model BA–1004, manufactured by Robertshaw Controls Company can be used for valves 1–7 and are shown in detail in U. S. Pat. No. 3,550,847.

USA Standard Graphic Symbols for Fluid Power Diagrams (USA Y32. 10-1967) are used for the various elements shown in the drawing. The references used for the various parts or connections to the devices are standard references. The diverter valves 1–7 are shown in the drawing with connections or passages completed when there is no pressure signal present at port S of the valves. Each of the AND connected diverter valves 1–4 have port NC blocked with port C connected to atmosphere via port NO. In the case of valves 2 and 4 the connection from port NO to atmosphere is via restrictors 22 and 23, respectively. Diverter valve 5 also has port NC blocked with port C connecting with port NO. However, port NO of valve 5 is plugged so port C does not connect to atmosphere.

The connections completed upon application of pressure at port S are those which occur when the upper block of the diagram for a diverter valve is viewed as having moved downward to take the place of the lower block. The spring shown at the bottom of the symbol indicates a return function which is effective when pressure at S is removed. Thus, in the case of the AND connected diverter valves 1–5, the ports NC and C are interconnected when pressure is presented at port S with no connection within the valves for port NO. In the case of the NOT connected diverter valves 6 and 7, the presence of pressure at port S causes the connection existing between ports NO and C to be interrupted with port C connected to port NC with no connection within the valve for port NO.

The control system is connected to a vibration responsive device 8 which may be a Model 368 pneumatic vibration detector sold by Robertshaw Controls Company under the trademark Vibraswitch. The device 8 is mounted on the equipment to be protected. Such a detector has an air valve (not shown) which is connected to the control system at 9 and is closed when the detector is in a normal or non-tripped condition. This air valve opens to atmosphere when the detector is tripped in response to an excessive vibration condition. Pressure when applied at 10 to the detector 8 is effective to reset the detector 8 to its non-tripped or monitoring condition. The resetting action closes the air valve of detector 8 which connects to the control system at 9.

The port NC for each of the diverter valves 1–5 is connected directly to the pressure supply line 11. The pressure supply line 11 is also connected to port C of diverter valve 7 when the manually and momentarily operable valve 12 connected between line 11 and valve 7 is operated. The valve 12 may be a Model BIK–3206–P manufactured by the Verson Product Company and is shown in schematic form. The output of the valve 12 also connects with port S of valve 3 and with an output line 13. The valve 12 will be referred to as the start valve.

A pneumatic indicator 14 is connected between port S of valve 3 and the pressure supply line 11. The indicator 14 will be referred to as the alarm indicator since it provides a perceptible indication of the pressure status of the output line 13. The indicator 14 may be a Model 81200–A1 monostable (air actuated, spring return) two position pneumatic indicator manufactured by Robertshaw Controls Company. Such an indicator provides a red "alarm" color indication when no air pressure is present at output line 13. When air pressure is present at output line 13 the indicator 14 has pressure presented at both of its connections and responds thereto to provide a green color indication.

The output 13, of course, provides a pressure or control signal for initiating and maintaining operation of the equipment (not shown) being monitored by the detector 8. Momentary actuation of the start valve 12 provides a pressure signal at output 13 for initiating operation of the equipment to be monitored. As will be explained, this pressure signal at 13 remains to keep the monitored equipment operating so long as the valve 7 does not receive a pressure signal at its port S to operate valve 7 and connect line 13 to atmosphere via the port C to port NC connection established by operation of valve 7.

The AND connected diverter valve 3 receives a pressure signal at port S when start valve 12 is actuated causing valve 3 to be operated. It can be seen that the pressure signal at port S of valve 3 must remain if valve 3 is to remain operated. Release of the start valve 12 will, of course, open the connection between the pressure supply line 11 and port S of valve 3. However, when valve 3 is operated the line pressure at port NC of valve 3 is presented at port C of valve 3 and connects via the NO to C connection of NOT connected valve 7 to feed back the pressure signal at port C to port S of valve 3. The connection is from line 11, port NC and port C of valve 3 then via a restrictor 24 to the port NO to port C connection valve 7 to port S of valve 3. Valve 7 therefore serves as a latching or holding valve. It can be seen that this holding or latching path for the pressure signal will be broken when valve 7 is operated in response to a pressure signal applied to port S. Port S of valve 7 connects with port C of valve 2. While the pressure also feeds back to the start valve 12, valve 12 is connected so a path through valve 12 is not presented when it is not operated.

The restrictor 24 is needed in the circuit so the line pressure from line 11 is certain to be effective to operate valve 3. Without restrictor 24 the line 11 would be connected directly to atmosphere via ports C and NO of valve 7 and ports C and NO of valve 3.

Since the equipment being monitored by detector 8 may present a vibration condition during start-up having a duration in excess of that which will be tolerated during operation of the equipment, it is necessary that a start delay be introduced which permits the equipment to complete the start-up without the system operating to shutdown the equipment in response to any start-up vibration. This delay is provided by the delay network connected to the AND connected diverter valve 4. The delay network includes the restrictor 15 and accumulator 16. The restrictor 15 is connected at one end to the port C of valve 3. Its other end is connected to port S of valve 4 and the accumulator 16. Thus, operation of valve 3 in response to operation of valve 12 connects the supply pressure present at supply line 11 to accumulator 16 and port S of valve 4 via the restrictor 15. The accumulator 16 and restrictor 15, of course, delay the build up of pressure at port S of valve 4 and thus, delay the operation of valve 4. Upon build up of the pressure at port S, valve 4 operates to connect the supply line pressure of line 11 to the port NO of valve 6 via the interconnected ports NC and C of valve 4.

Assuming there has been sufficient vibration during the start-up period to trip the detector 8, the air valve (not shown) of detector 8 connecting at 9 will operate to present a path to atmosphere via the connection 9 which in addition to being connected to port C of valve 5 connects with the port S of valve 6. Pressure, of course, cannot be built up at port S of valve 6 in view of the connection of port S to atmosphere via the air valve (not shown) at 9 provided by detector 8 in its tripped condition. The restrictor 17 presented between the supply line 11 and the port S of valve 6 prevents operation of valve 6 because of the open valve 9. Therefore, valve 6 allows a pressure signal to be applied to two delay networks. One delay network includes the accumulator or pneumatic capacitance 18 and restrictor 19. The accumulator 18 is connected to port S of valve 1 and one end of restrictor 19. The other end of restrictor 19 connects with port C of valve 6. The other delay network is associated with valve 2 and includes accumulator 20 and restrictor 21. It is designed to provide a longer delay than that provided by restrictor 19 and accumulator 18. The accumulator 20 is connected to port S of valve 2 and to one end of the restrictor 21. The other end of restrictor 21 connects with the port C of valve 6 connected end of restrictor 19.

Thus, a pressure signal presented at port NO of valve 6 will build up the pressure in the accumulator tanks 18 and 20. Accumulator 20 is larger than accumulator 18 so the pressure at accumulator 18 and therefore at port S of valve 1 reaches the value needed to actuate valve 1 before the pressure at accumulator 20 becomes great enough to cause valve 2 to operate.

Operation of valve 1 causes the supply pressure present at line 11 to be applied via the connection established between port NC and port C of valve 1 to the reset connection 10 at detector 8 causing the air valve (not shown) in detector 8 associated with the connection 9 to close. In addition, port C of valve 1 connects with port S of valve 5 causing valve 5 to operate to provide a by-pass around restrictor 17 via the connection established between port NC and port C of valve 5 and the connection of port C of valve 5 to connection 9 of detector 8 and port S of valve 6. This by-pass eliminates any unnecessary delay in the build up of pressure at port S of valve 6 that might otherwise be present due to the length of line to the detector 8 and the limited flow through restrictor 17. This immediate build up of pressure at port S of valve 6 by the operation of valve 5 at the same time the detector 8 is reset causes valve 6 to operate to remove the port NO to port C connection and therefore remove the pressure signal being supplied to the two delay networks connected with valves 1 and 2.

Operation of valve 6 also serves to connect port C of valve 6 to atmosphere via port NC. A one-way or check valve 25 is connected across restrictor 19 which permits the accumulator 18 to be immediately dumped to atmosphere via the port C to port NC connection established by the operation of valve 6. Accumulator 20, however, bleeds down slowly due to the restrictor 21 between accumulator 20 and port C of valve 6. Upon loss of pressure at port S of valve 1 due to the dumping of accumulator 18, valve 1 returns to its normal position causing the connection between port NC and port C of valve 1 to be removed thereby removing the line pressure signal from port S of valve 5. Diverter valve 5 therefore moves to its normal position to remove the connection between its port NC and C and thus open the by-pass path around restrictor 17. The system is then in condition to respond to vibrations capable of tripping detector 8 to open the air valve (not shown) which connects with the input 9.

The two delay networks associated with diverter valves 1 and 2 permit the monitoring unit to discriminate between false transient signals and the true existence of excessive vibration forces. The restrictor 19 and accumulator 18 with valve 1 serve to "sample" a detected excessive vibration condition and upon operation of diverter valve 1 reset the detector 8 to again monitor the vibration condition. If the vibration condition continues a number of "samples" or detections will take place. Each detection of an excessive vibration condition trips the detector 8 causing the pressure in accumulator 20 to increase. Since accumulator 20 bleeds off more slowly than accumulator 18 following actuation of valve 1, accumulator 20 retains some of its pressure buildup and thus serves to provide a memory of the vibration excesses that have occurred. After a sufficient number of "samples" of an excessive vibration condition have been taken accumulator 20 will present a pressure at port S of valve 2 sufficient to operate valve 2.

Actuation of diverter valve 2 causes its port NC and C to be interconnected to apply line pressure from line 11 to port S of valve 7 to operate valve 7. Operation of valve 7 connects the output line 13, port S of valve 3, and one side of the indicator 14 to atmosphere via the port C to NC connection completed by operation of valve 7. The indicator 14 therefore provides a red indication to signify an alarm or shut down condition. The loss of pressure at port S of valve 3 causes it to return to its normal position breaking the connection between ports NC and C of valve 3 and connecting port C of valve 3 to port NO which opens to atmosphere.

A check or one-way valve 26 is connected in parallel with restrictor 15. The check valve 26 together with the path to atmosphere provided by the port C to port NC connection of valve 3 permits the accumulator 16 to be dumped to atmosphere. Shutdown of the monitoring system and the equipment being monitored is thus completed. The system can be started again by momentary actuation of start valve 12 to again apply line pressure from line 11 to the equipment being monitored and port S to valve 3 for placing the monitoring system in operation once again.

It can be appreciated that an operable system might be presented without using diverter valve 5 when a single vibration detector 8 is being monitored. Valve 5 serves to eliminate any undesirable delay that may be presented in an installation due to a long length of line to the port 9 of the vibration detector 8. There may be any number of installations of the system where such a delay problem is not presented.

While the indicator 14 is shown as a non-bleed type indicator it should be recognized that the indicator 14 can be the type which only requires a connection to output 13 to have it operate. Some of such indicators have a bleed to atmosphere which can be restricted to reduce any consumption while other such indicators do not have any bleed to atmosphere.

Figure 2:
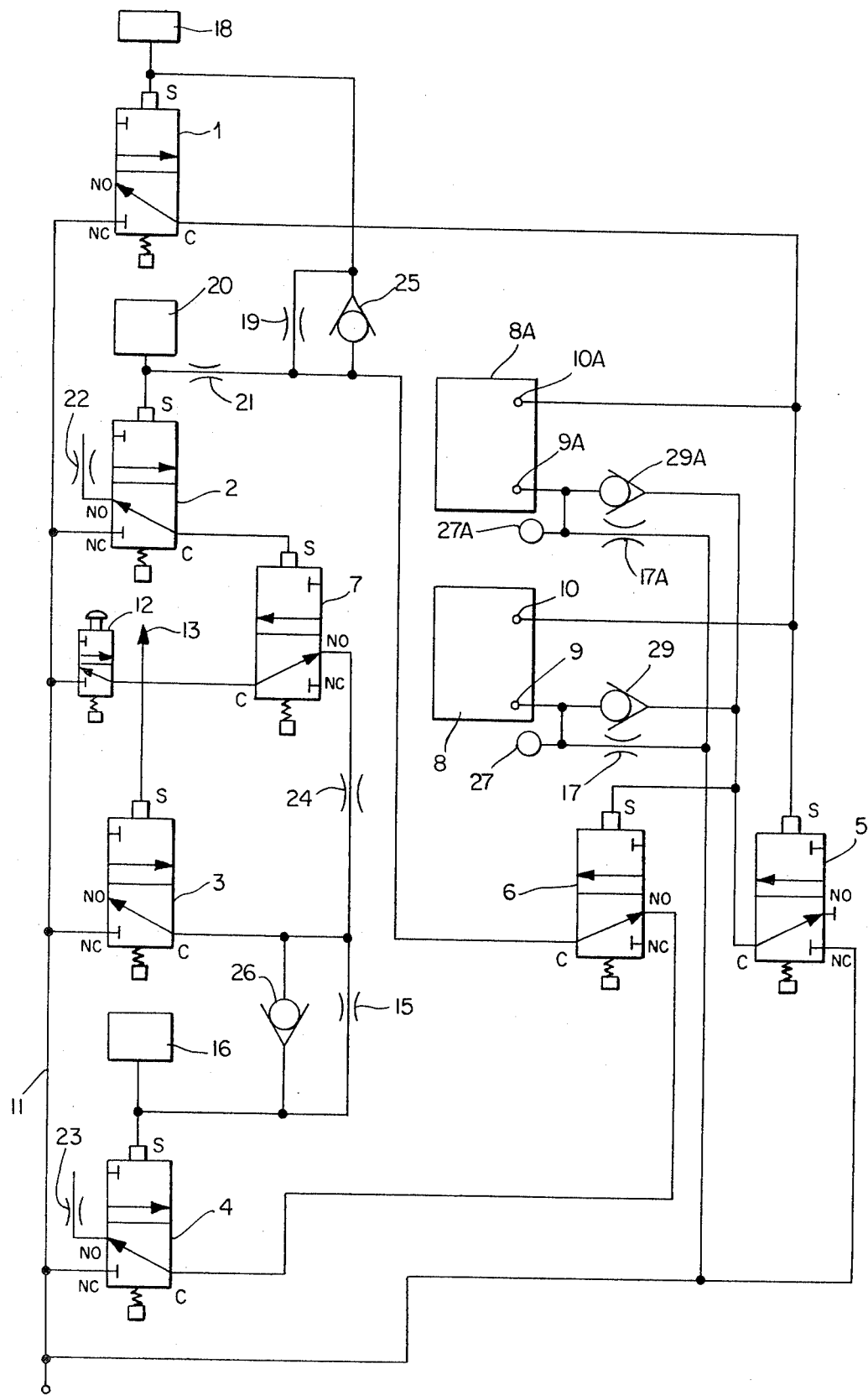

FIG. 2 is a schematic showing of an embodiment of the invention wherein more than one vibration detector is monitored. Where applicable, the same reference numerals used in FIG. 1 are used in FIG. 2. Two vibration detectors 8 and 8A are connected for monitoring by the system. Additional detectors can be connected in a similar manner. Since more than one vibration detector is being monitored a visual indicator is used with each detector. Indicators 27 and 27A are connected to connection 9 and 9A, respectively, of the detectors 8 and 8A. The indicators 27 and 27A thus respond to the condition of the air valves (not shown) which connect with 9 and 9A. The air valves are closed when the detector is in a normal or non-tripped condition and open to atmosphere when the detector is tripped in response to an excessive vibration.

The embodiment shown in FIG. 2 can be best explained by considering the additions made in the connections per FIG. 1 to arrive at FIG. 2 to permit more than one detector to be connected for monitoring by a single system. Check valves 29 and 29A are additional elements. Thus, detector 8 has the connection 9 connected to port S of diverter valve 6 via a check valve 29. The check valve 29 is connected to permit flow in the direction from port S of valve 6 to connection 9 of detector 8. The second detector 8A has a check valve 29A similarly connected. A restrictor 17A is also connected in a similar manner as restrictor 17 between connection 9A of detector 8A and line 11.

The initiation of the operation of the system shown in FIG. 2 is the same as has been described for FIG. 1. Thus, following the start delay provided by the restrictor 15 and accumulator 16, diverter valve 4 is operated to present line pressure from line 11 to the NO port of valve 6. Assuming a pressure signal is not present at port S of valve 6, the line pressure is presented to port S of diverter valve 1 via the NO to C connection through valve 6 after the delay provided by accumulator 18 and restrictor 19 is satisfied. This causes diverter valve 1 to operate to complete the port NC to C connection to connect the pressure from line 11 to port S of diverter valve 5 and to ports 10 and 10A to reset detectors 8 and 8A, respectively. Valve 5 operates in response to the pressure signal applied to port S causing pressure from line 11 to be applied via the NC to C connection of valve 5 to port S of diverter valve 6, ports 9 and 9A of detectors 8 and 8A, respectively. The presence of a pressure signal at port S of valve 6 causes it to operate. Operation of valve 6 connects port S of diverter valve 1 to atmosphere via check valve 25 and the port C to NC connection completed by operation of valve 6. With the pressure signal removed from port S of valve 1, valve 1 provides a path to atmosphere via its port C to NO connection to remove the pressure signal from port S of valve 5. The connection between port C and NO completed by valve 5 upon loss of the pressure at port S does not disturb the pressure signal at port S of valve 6 since port NO of valve 5 is blocked. The pressure signal at port S of valve 6 is only removed when one of the detectors 8 or 8A is tripped to connect port S of valve 6 to atmosphere.

The restrictors 17 and 17A as well as the check valves 29 and 29A are important when less than all of the detectors are tripped by a vibration condition. Thus, assume detector 8 has tripped. Only visual indicator 27 will show an alarm or tripped condition since the pressure at 9A will be maintained. Even if the seal at the air valve (not shown) connecting with 9A were not perfect, the restrictor 17A provides line pressure to 9A to make up for any loss via an imperfect seal. The check valve 29A serves to prevent 9A from being connected to atmosphere via 9 should detector 8 be tripped. Check valve 29 and restrictor 17 serve a similar purpose in the event detector 8A is tripped.

The particulars of the foregoing description are provided merely for the purpose of illustration and are subject to modifications and variations without departing from the novel teachings disclosed therein. Accordingly, the scope of this invention is intended to be limited only as defined in the appended claims, which should be accorded a breadth of interpretation consistent with this specification.

What is claimed is:

1. A pneumatically operated control system for use with a vibration detector having a valve which is opened or closed according to the tripped or non-tripped condition of the detector with the detector resettable to the non-tripped condition by a pneumatic signal, the system including, manually operated valve means, a first valve means having a first input connected to said manually operated valve means, said first valve means providing a first output signal for the system and a delayed second output signal in response to momentary actuation of said manually operated valve means, said first valve means having a second input, said first valve means responding to a signal applied to said second input to terminate said first and second output signals, a second valve means connected to receive said second output signal of said first valve means, said second valve means also being connected to the vibration detector, said second valve means when receiving said second output signal of said first valve means providing a reset signal to said vibration detector a predetermined time after said vibration detector assumes the tripped condition, said second valve means providing a signal to said second input of said first valve means, the occurrence of said last mentioned signal being a function of the number of times the vibration detector is reset and the time between the reset signals provided to the vibration detector.

2. The control system in accordance with claim 1 wherein said first valve means includes two "AND" connected valves, a "NOT" connected valve and a pneumatic delay, each of said "AND" valves having a first input for connection to the pneumatic supply for the system, the output for one of said "AND" valves connecting with an input of said "NOT" valve and with said delay, the output of said "NOT" valve connecting with the second input of said one "AND" valve, said manually operated valve and said system output, said "NOT" valve thereby serving to hold said one "AND" valve operated, said "NOT" valve having a second input which is said second input for said first valve means, said delay connecting with a second input for the other of said two "AND" valves, and the output of said other "AND" valve providing said delayed second output signal of said first valve means.

3. The control valve in accordance with claim 2 wherein said pneumatic delay includes an accumulator connected to said second input of said other "AND" valve, said delay further includes a one-way valve connected between said accumulator and said output of said one "AND" valve, said one "AND" valve having said output connected to atmosphere in the absence of a signal at said second input of said one "AND" valve, said one-way valve connected for flow from said accumulator whereby said accumulator is connected to atmosphere when said one "AND" valve does not have a signal presented to said second input of said "AND" valve.

4. The control valve in accordance with claim 3 wherein said pneumatic delay includes a restrictor connected to said accumulator and in parallel with said one-way valve.

5. The control system in accordance with claim 1 wherein said second valve means includes a "NOT" connected valve receiving said second output signal of said first valve means at one of its two inputs, the other of said inputs of said "NOT" valve connected with the valve in the detector, said "NOT" valve providing an output when the detector is tripped, two pneumatic delays, each connected to the output of said "NOT" valve, one of said two delays controlling a first valve connected to the detector to provide said reset signal in response to operation of said first valve upon completion of said one of said two delays, said second valve means including means resetting said one of said two delays when the detector is reset, the other of said two delays when completed controlling a second valve providing said signal to said second input of said first valve means.

6. The control system in accordance with claim 5 wherein said one of said two delays includes an accumulator and said means resetting said one of said two delays includes a one-way valve connected between said accumulator and said "NOT" valve output, said "NOT" valve providing a path to atmosphere when operated in response to a signal applied to the detector connected input of said "NOT" valve, said one-way valve permitting flow from said accumulator to said "NOT" valve output.

7. The control system in accordance with claim 6 wherein said one of said two delays includes a restrictor connected to said accumulator and in parallel with said one-way valve.

8. The control system in accordance with claim 1 wherein said second valve means includes a "NOT" connected valve having a first input and a controlled input, said first input connects with said first valve means to receive said second output signal, said controlled input connects with the valve of the detector, a restrictor connected to said controlled input and to the pneumatic supply for said system.

9. The control system in accordance with claim 8 wherein said second valve means includes a two-input, single output "AND" connected valve having one of said "AND" inputs connected to said pneumatic supply, the other of said "AND" valve inputs connected to receive said reset signal and the output of said "AND" valve connected to said controlled input of said "NOT" valve, said "AND" valve thereby providing a path around said restrictor when said "AND" valve is receiving a signal at its two inputs.

10. The control system in accordance with claim 5 wherein said first valve and said second valve are "AND" connected, each of said first and second valves having two inputs and a single output, one input for said first and second valves connecting with the pneumatic supply for the system, the other input of said first valve connecting with said one of said two delays, said first valve providing said reset signal at its output and the other input of said second valve connecting with said other of said two delays, said output of said second valve providing said signal to said second input of said first valve means.

11. The control system in accordance with claim 1 wherein said second valve means includes a "NOT" connected valve receiving said second output signal of said first valve means at one of its two inputs, a one-way valve connecting the other of said two inputs of said "NOT" valve with the valve in the detector, said one-way valve connected for flow from said other input to said valve in the detector, said "NOT" valve providing an output when the detector is tripped, two pneumatic delays, each connected to the output of said "NOT" valve, one of said two delays controlling a first valve connected to the detector to provide said reset signal in response to operation of said first valve upon completion of said one of said two delays, said second valve means including means resetting said one of said two delays when the detector is reset, the other of said two delays when completed controlling a second valve providing said signal to said second input of said first valve means.

12. The control system in accordance with claim 11 wherein said one of said two delays includes an accumulator and said means resetting said one of said two delays includes a one-way valve connected between said accumulator and said "NOT" valve output, said "NOT" valve providing a path to atmosphere when operated in response to a signal applied to the detector connected input of said "NOT" valve, said one-way valve permitting flow from said accumulator to said "NOT" valve output.

13. The control system in accordance with claim 11 wherein said first valve and said second valve are "AND" connected, each of said first and second valves having two inputs and a single output, one input for said first and second valves connecting with the pneumatic supply for the system, the other input of said first valve connecting with said one of said two delays, said first valve providing said reset signal at its output and the other input of said second valve connecting with said other of said two delays, said output of said second valve providing said signal to said second input of said first valve means.

14. The control system in accordance with claim 1 wherein said second valve means includes a "NOT"

connected valve having a first input and a controlled input, said second valve means also includes a two input, single output "AND" connected valve, one of said "AND" inputs connecting with the pneumatic supply for the system, the other of said "AND" valve inputs connected to receive said reset signal with the output of said "AND" valve connected to said controlled input of said "NOT" valve, said "AND" valve thereby immediately providing a signal to said controlled input of said "NOT" valve upon receipt of said reset signal, said first input of said "NOT" connected valve connecting with said first valve means to receive said second output signal.

15. A pneumatically operated control system for use with one or more vibration detectors each of which have a valve that is open or closed according to the tripped or non-tripped condition of the detector with each detector resettable to the non-tripped condition by a pneumatic signal, the system including, a first valve means providing a delayed start signal, a second valve means having a first and second input, said first input connected to receive said delayed start signal, said second valve means having an output so long as said delayed start signal is present and a signal is not present at said second input, a third valve means connected to the output of said second valve means, said third valve means providing a reset signal in response to the output of said second valve means, a fourth valve means having an input connected to said third valve means to receive said reset signal and having an output connected to said second input of said second valve means, said fourth valve means providing a signal for said second input of said second valve means upon presentment of said reset signal to said fourth valve means, means connecting each detector to said third valve means to receive said reset signal, and a one-way valve for each detector connecting the valve in each detector to said output of said fourth valve means and to said second input of said second valve means, each one-way valve permitting flow from said second input of said second valve means to its associated detector, any detector upon opening of its valve thereby removing a signal present at said second input of said second valve means.

16. The control system in accordance with claim 15 wherein said third valve means is connected to said first valve means, said third valve means providing a signal to said first valve means to terminate said delayed start signal, said third valve means providing said signal to said first valve means as a function of the number of times said third valve means provides said reset signal and the time between said reset signals.

* * * * *